Nov. 26, 1935. C. K. GREENE 2,022,499
PITCH CHANGE CONTROL
Filed Aug. 4, 1932 2 Sheets-Sheet 1
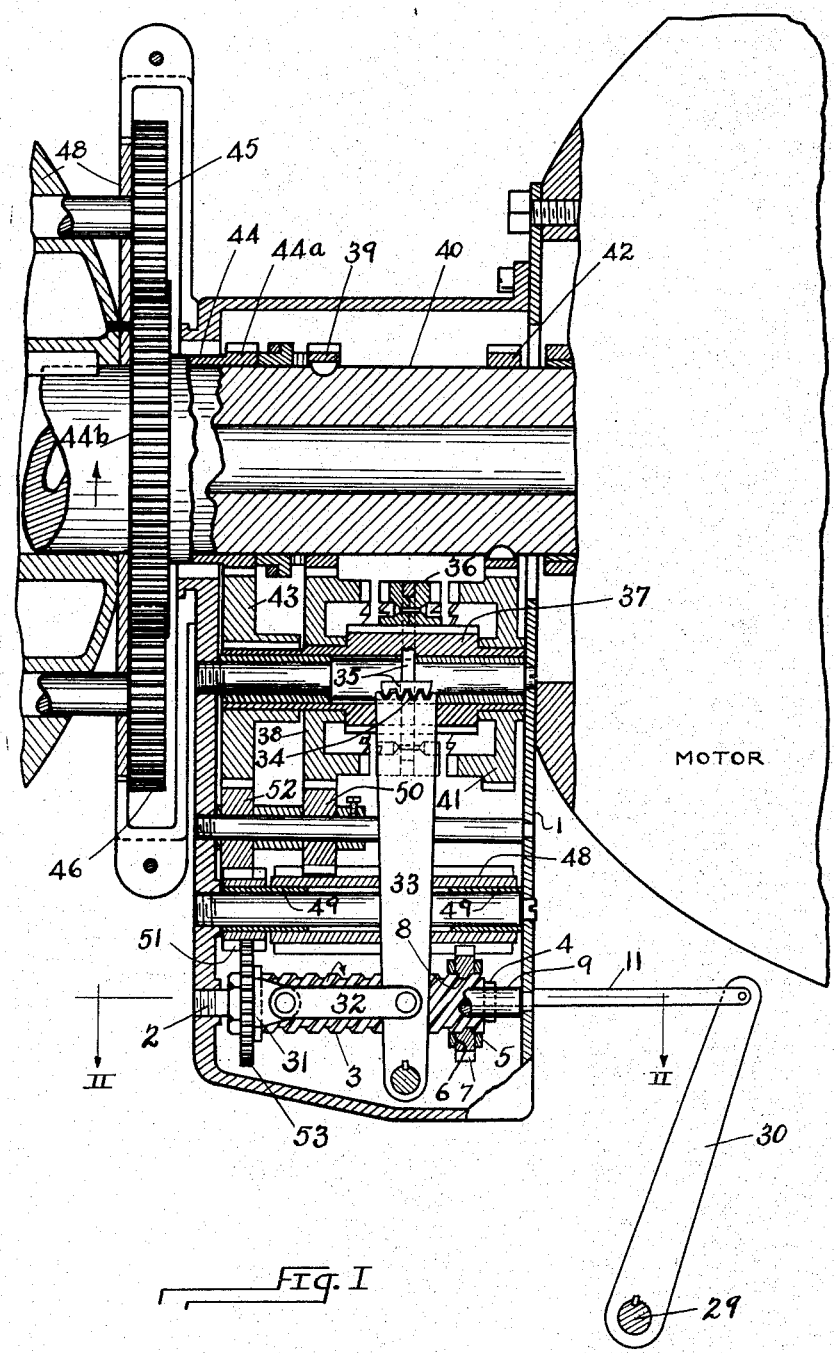
Fig. I
INVENTOR
Clarence Kirk Greene
by Christy Christy and Wharton
his attorneys Nov. 26, 1935. C. K. GREENE 2,022,499
PITCH CHANGE CONTROL
Filed Aug. 4, 1932 2 Sheets-Sheet 2
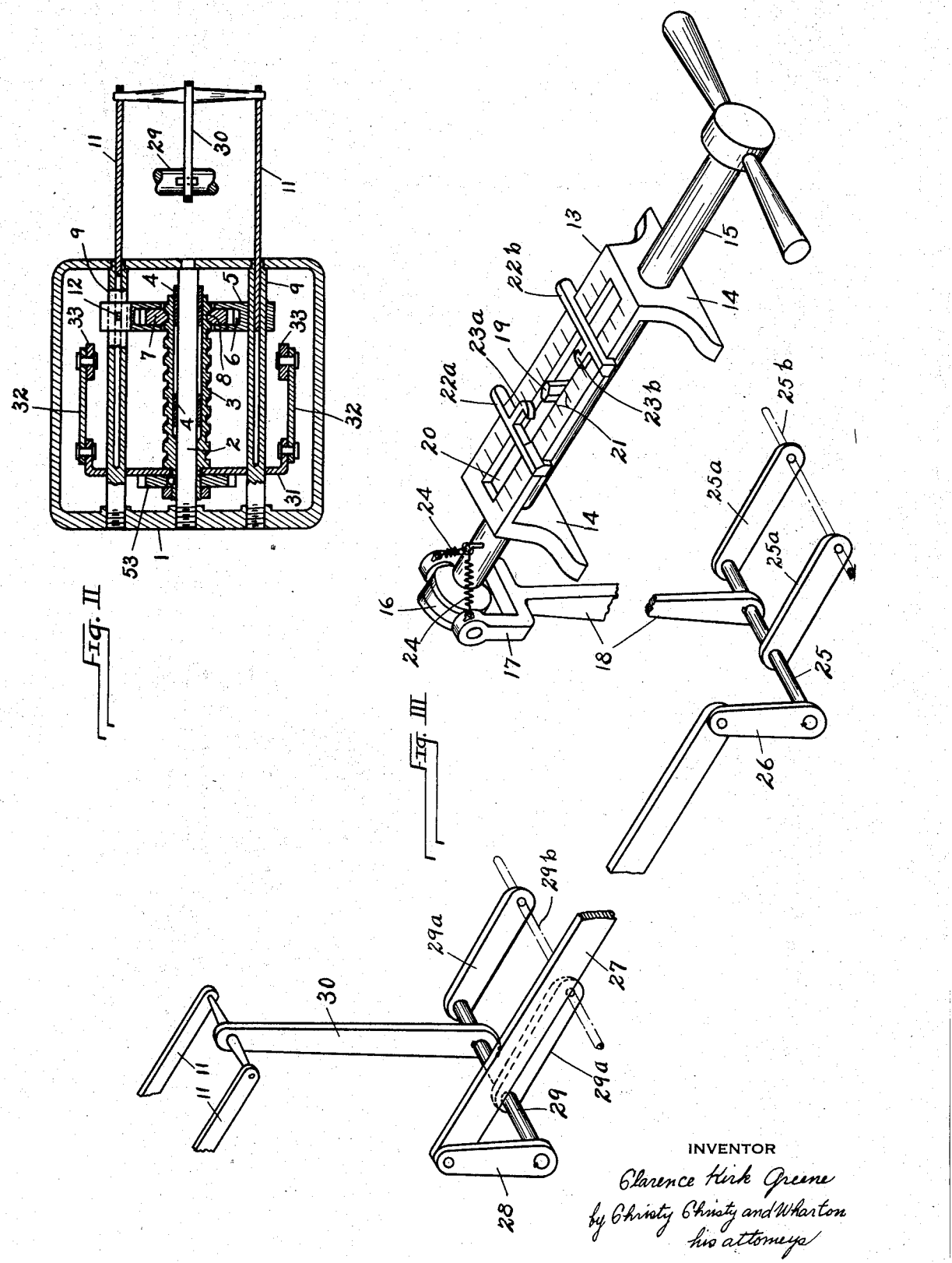
INVENTOR
Clarence Kirk Greene
by Christy Christy and Wharton
his attorneys Patented Nov. 26, 1935

2,022,499

UNITED STATES PATENT OFFICE 2,022,499

PITCH CHANGE CONTROL

Clarence Kirk Greene, Los Angeles, Calif.

Application August 4, 1932, Serial No. 627,451

8 Claims. (Cl. 170—163)

This invention relates to the control of pitch changes in propellers and particularly to pitch change in the propellers of air craft.

An object of my invention is to provide control means so constructed and arranged that pitch-changing action may be conveniently instituted by the pilot of the craft.

Another object of the invention is to provide control means for pitch change which permits the pitch-changing action to proceed automatically when once initiated by the pilot, and which automatically and positively terminates the pitch-changing action when it has proceeded to a predetermined degree.

Additional objects of my invention are to provide control apparatus operable from a distance and comprising manually operable means conveniently placed for the pilot of the craft, final control elements associated with the pitch change mechanism proper which are simple, positive in their action, and may be comprised within a relatively small space, and to provide a single operating line so arranged between the pilot's control and the final control elements that the single line serves to transmit both the movement produced by the pilot, or other extraneous agency initiating pitch change action, and the ensuing automatic movement produced by the pitch change action, which results in the accurate indication and positive limitation of the extent of such action.

In the accompanying drawings Figure I is a vertical sectional view through that portion of my pitch change control apparatus which is directly associated with pitch change mechanism, showing the elements of an exemplary form of the pitch change mechanism which are directly co-operative with my control apparatus; Figure II is a horizontal sectional view taken on the line II—II of Figure I, looking in the direction of the arrows, and also showing in plan the associated control elements illustrated in Figure I; and Figure III is an isometric view showing the pilot's control for initiating pitch-changing action, and that portion of the means for automatically limiting pitch-changing action which is directly associated with or constitutes a part of the pilot's control, and showing a single line of linkage effective for transmitting movement for both the said purposes, the greater portion of the said linkage being shown on a somewhat smaller scale than the other portion of the figure.

My apparatus for controlling and limiting the change of propeller blade pitch comprises a casing 1, associated with the pitch change mechanism proper. Mounted in casing 1 is a fixed shaft 2 having thereon a hollow threaded shaft 3, which is mounted for end play on the fixed shaft 2, and is provided with suitable bearings such as bronze bushings 4. Freely slidable on threaded shaft 3 is a collar 5 provided with a cleft 6 in which lies a nut 7. Nut 7 is externally toothed to form a gear of spur type, and is provided interiorly with teeth 8 co-operatively engaging the thread of shaft 3. Threaded shaft 3 may thus be shifted with movement of collar 5, and collar 5 may be moved longitudinally of the shaft by relatively longitudinal movement of the nut 7 on the shaft 3.

Guideways for collar 5 are provided by rods 9, which may be mounted in casing 1, as shown, and which lie within guide holes 10 through the collar 5. Guide rods 9 are longitudinally slotted to receive operating push-pull rods or cables 11, which are anchored at 12 to the collar 5. Push-pull rods 11 serve as control conections from the operating assembly described above to primary operating means which may be mounted in a relatively remote position, as adjacent the pilot's seat of an airplane in which the mechanism is installed.

This primary control means comprises a scale frame 13, which may be mounted in fixed position. Passing through the legs 14 of the scale frame is a control rod 15, which has a swivel mounting 16 in the fork 17 of lever 18. Fixed to control rod 15 is a block 19 lying within slot 20 of the scale frame. This block 19 by its position with respect to scale 21 indicates propeller blade pitch position, and also serves as a lug in co-operation with adjustable stops 22a and 22b in limiting pitch changes of the propeller blades. Stops 22a and 22b extend across slot 20, and each comprises a hooked member 23a and 23b, respectively, which extends partially across the slot.

At either limit of movement of block 19 it lies in the recess embraced by one of the hook members. As noted above, control rod 15 has a swivel mounting in fork 17, so that turning the control rod engages block 19 behind either one of the hook members, or removes it from engagement therebehind. Springs 24 exert a force tending to maintain sliding block 19 upright in slot 20, while permitting oscillation of the control rod about its own axis to allow engagement of block 19 behind the hook members, and disengagement of block 19 from behind either of the hook members.

To initiate pitch change of the propeller blade, shaft 15 is oscillated sufficiently to disengage block 19, ant the shaft 15 is moved longitudinally away from the stop against which it is located. This movement, by suitable linkage, is transmitted to operating means such as the push-pull rods 11. As shown, the linkage comprises the lever 18 mounted adjacent the scale frame 13, which by change in its angular position produces angular movement of a shaft 25 to which it is rigidly connected. Shaft 25 is journaled in arms 25a, which terminate at a fixed pivot 25b, and shaft 29 is journaled in arms 29a, terminating on a fixed pivot 29b. By means of a crank linkage comprising arms 26, 27, and 28, the same degree of angular movement is imparted to the second shaft 29, having rigidly mounted thereon a lever 30. Lever 30 has attached thereto the push-pull rods or cables 11, or other suitable operating connection. It may be understood that while the scale frame 13 and its associated elements are mounted adjacent the pilot seat, the second lever 30 and its associated elements may be mounted in a relatively remote position adjacent the mechanism for effecting changes in the pitch of the propeller blades.

By the above, or other suitable operating connections, force may be exerted on collar 5 to shift shaft 3 in either direction along its longitudinal axis. As explained above, the mounting of the shaft 3 permits it a limited shifting movement. Carried by shaft 3 is a second collar 31, connected as by links 32, with pivoted clutch-operating arms 33. Clutch-operating arms 33 are formed terminally to provide arcuate racks 34 in mesh with a toothed collar 35 on shiftable clutch 36, which clutch constitutes an element of pitch-changing mechanism such as that disclosed in my copending application Serial No. 598,806, filed March 16, 1932. Generally described, the exemplary pitch-changing mechanism, of which clutch 36 forms a part, comprises a countershaft 37 to which the clutch is splined. Countershaft 37 carries a gear 38, rotatable on the shaft, which meshes with a gear 39 carried by the crankshaft 40. A second gear 41 is also free on countershaft 37 and meshes with a gear 42 on crankshaft 40. Clutch 36 is slidable on countershaft 37 to operatively engage either of the gears 38 or 41 to the countershaft.

Gear 38 has a lesser number of teeth than gear 39 with which it meshes, and by which it is driven. Operative engagement of gear 38 with countershaft 37 therefore drives the countershaft at an angular speed greater than crankshaft speed. Gear 41 has a greater number of teeth than gear 42 by which it is driven, and operative engagement of gear 41 with countershaft 37 therefore drives the countershaft at an angular velocity less than crankshaft speed.

As to the actual pitch change operation it is sufficient for the present purpose to say that countershaft 37 carries a gear 43 in mesh with one portion 44a of a double gear 44 rotatable on crankshaft 40. The other portion 44b of double gear 44 meshes with pinions 45 and 46, which in suitable association, such for example as that illustrated and described in my co-pending application, determines the pitch-changing rotation of the blades of the airplane propeller.

Pinions 45 and 46 being mounted in hub 48 are carried at crankshaft speed. If countershaft 37 is unconnected operatively either with gear 38 or gear 41, gear 44, the portion 44b of which constitutes a sun gear, is also carried at crankshaft speed, being in mesh with the pinions 45 and 46. Countershaft 37, is also driven at crankshaft speed by gear portion 44a, which meshes with gear 43 fixed on the countershaft. If gear 38 is operatively engaged with countershaft 37, sun gear 44 will be rotated at greater than crankshaft speed, while if gear 41 is engaged to countershaft 37 sun gear 44 will be rotated at less than crankshaft speed. In either deviation of sun gear speed from crankshaft speed there will be relative movement between the sun gear and the pinions 45 and 46. In the arrangement disclosed in my above noted co-pending application, an increased sun gear speed as compared with crankshaft speed serves to produce an increase in propeller blade pitch.

To follow the operation in the particular set up of connections illustrated, the pilot to produce a decrease in propeller blade pitch rotates shaft 15 sufficiently to disengage block 19 from behind hook member 23a on stop 22a, and then draws shaft 15 a slight distance to the right as shown in the drawings. Through the linkage and connections described, this action shifts collar 5 toward the airplane motor, that is toward the right as shown in the drawings, thus shifting threaded shaft 3 to the limit of its movement in that direction. By the connections comprising collar 31 links 32, pivoted arms 33, and the toothed collar 35 carried by clutch 36 and meshing with arcuate racks 34 an arms 33, clutch 36 is moved into engagement with gear 41 to operatively engage that gear with countershaft 37. By the gear connections described, this connection results in rotating sun gear 44 at less than crankshaft speed, and therefore produces a rotation decreasing the propeller blade pitch. Conversely movement of the pilot's control shaft 15 in the opposite direction would produce ultimate action resulting in an increase in propeller blade pitch.

The means for automatically limiting changes in propeller blade pitch comprises an elongated gear 48, mounted on bearings 49 in the casing 1, and meshing with toothed nut 7. In mesh with elongated gear 48 is a pinion 50 which is also in mesh with gear 38, so that elongated gear 48 and nut 7 are rotated by connection with it. On forward bearing 49 there is also rotatable a second gear 51, and a pinion 52 meshes with this gear 51 and with gear 43 in mesh with the element 44a of double gear 44. A gear 53 fixed on threaded shaft 3 meshes with gear 51.

Gear 53 fixed on threaded shaft 3 serves to produce rotation of the shaft, and nut 7 is rotated by its meshing engagement with elongated gear 48. The ratio of the gears and pinions constituting the two gear trains which respectively rotate shaft 3 and threaded nut 7 is such that in inoperative condition of the mechanism, with clutch 36 disengaged, shaft 3 and nut 7 are rotated at equal speed in the same direction. With gear 38 clutched to countershaft 37, shaft 3 is rotated at an increased speed, since the gear 43 then rotates at greater than crankshaft speed. Since the speed of rotation of nut 7 is unchanged, there will thus be relative longitudinal movement of the nut 7 on the shaft 3.

As shown, the thread on shaft 3 is a left hand thread, and rotation of the shaft in a counterclockwise direction as viewed from the propeller end of the shaft, at a speed greater than the speed of rotation of the nut, carries the nut forward or toward the propeller of the craft. Nut 7 moves longitudinally, carrying with it collar 5, which acts through push-pull connections 11, and the linkages, to move block 19 in accordance with pitch change in the propeller blades. This directional movement of block 19 is definitely limited by stop 22a which has been positioned with respect to scale 21 to define the desired maximum propeller blade pitch. When block 19 contacts the stop 22a, the push or pull on block 19 tends to rotate adjusting shaft 15 and to engage block 19 behind hooked member 23a, thus locking the block 19 in maximum pitch position.

Since longitudinal movement of nut 7 on threaded shaft 3 is thus arrested, the continued differential rotation of the nut and the shaft shifts threaded shaft 3 back into intermediate or inoperative position. This movement is transmitted by the second collar 31 carried by shaft 3, links 32, pivoted clutch-operating arms 33, and toothed collar 35 on shiftable clutch member 36, to disengage clutch 36 from gear 38, thus breaking operative connection between gear 38 and countershaft 37.

We shall assume that threaded shaft 3 has been intentionally shifted in an opposite direction, causing clutch member 36 to engage gear 41 to countershaft 37, to produce a decrease in propeller blade pitch. In this instance the double sun gear 44, comprising sun gear portion proper 44b is rotated at an angular speed less than crankshaft speed, and gear 43 driving the sun gear is obviously rotated at less than crank shaft speed. Consequently threaded shaft 3, driven from gear 43, is given a decreased speed of rotation with respect to the speed of rotation of nut 7, since the speed of rotation of nut 7, driven by connection with gear 38 remains uniform with respect to crankshaft speed.

This differential speed causes nut 7, carrying collar 5, to move longitudinally on threaded shaft 3 in a direction opposite to that previously described, and which is shown as the direction away from the propeller. By push-pull connections 11, and suitable linkages such as those described, block 19 is thus moved toward stop 22b, and at the limit of its movement engages behind hook member 23b thereon. By contact of guide block 19 with this stop, similarly, the continued differential rotation between nut 7 and shaft 3 similarly produces movement of shaft 3, and thereby produces movement of clutch member 36 which disengages it from gear 41, and permits gear 41 to rotate idly on countershaft 37.

The control mechanism for the pitch change apparatus therefore serves both to enable pitch change action to be manually initiated, and also serves to positively limit the degree of such pitch change when initiated.

It should be noted that in my control apparatus for pitch change mechanism, the pilot institutes the action producing pitch change, and that the action then continues to a predetermined limit without further action or regulation on the part of the pilot. The locking of the sliding block in the pilot's control mechanism behind the hook members shown, or similarly operating locking means, positively prevents accidental pitch changes.

The control apparatus for pitch change mechanism has been illustrated and described for purposes of explanation as associated with a specific type of pitch change mechanism proper. It should be understood, however, that the control apparatus as to its primary features may be associated with various other existing or possible types of pitch change mechanism, as for example my prior Patent No. 1,782,167 and the patent to Spencer Heath No. 1,589,174.

It is a great advantage of my apparatus that it operates in an emergency by a single manual operation by the pilot, the process and limitation of its change being then automatically carried forward and controlled. Thus if there is a sudden necessity for decreased propeller blade pitch, such as the necessity for immediate rapid climbing, the pilot may initiate the action producing a decrease in propeller blade pitch, and is then free to attend to the control of the craft.

While the connections herein shown are adapted to initiation of propeller blade pitch changes by manual operation, it should be understood that the control means proper, that is the mechanism directly associated with the pitch change mechanism, is in itself adaptable for association with means actuated by variation in engine speed, or other automatically operating agency, so acting on the control mechanism proper as to initiate pitch-changing action.

It may be noted that "cables" are given above as connections capable of performing a pushing, as well as a pulling, action. It should be explained that when cables are used, instead of the push-pull rods shown, they are so housed in confining tubes that they are effective push-pull cables.

I claim as my invention:

1. In control apparatus associated with mechanism for changing the pitch of propeller blades, the combination of a control member operatively connected with the pitch-changing mechanism and movable in two directions from neutral position to act upon the pitch-changing mechanism to produce, respectively, increased propeller blade pitch and decreased propeller blade pitch, a travelling member connected with said control member and movable relatively thereto under the influence of the pitch-changing mechanism, a contact member in a position remote from the pitch-change mechanism, connections between said contact member and said travelling member movable under the influence of said pitch change mechanism, means operable through said connections for moving said control member from neutral position into either operative position by its connection with the member movable relatively thereto, and stops limiting movement of said contact member and the said travelling member whereby inhibition of the movement of said contact member acts to inhibit movement of said travelling member relatively to the control member under the influence of the pitch change mechanism and thereby to move said control member from operative position into neutral position.

2. In control apparatus associated with mechanism for changing the pitch of propeller blades, the combination of two members threaded to each other, one of said members being a travelling member and the other member being movable in two directions from neutral position and operatively connected with said pitch change mechanism to initiate action producing increased propeller blade pitch by movement in one direction and to initiate action producing decreased propeller blade pitch by movement in the other direction, and connections operable from said pitch change mechanism and operated thereby during pitch-changing action for producing different speed of rotation of said two threaded members and thereby producing relative longitudinal movement of said two threaded members between set limits, whereby inhibition of longitudinal movement of the travelling member acts to produce longitudinal movement of the other member in an opposite direction into neutral position.

3. In control apparatus associated with mechanism for changing the pitch of propeller blades, the combination of two members threaded to each other, one of said members being a travelling member and the other member being movable in two directions from neutral position and operatively connected with said pitch change mechanism to initiate action producing increased propeller blade pitch by movement in one direction and to initiate action producing decreased propeller blade pitch by movement in the other direction, connections for rotating said members at an equal speed whereby their relative position is unchanged and for rotating the members at unequal speed whereby the travelling member is given movement of translation relatively to said operatively-connected member, and stops arranged to limit movement of said travelling member whereby at either limit of its travel it acts to force said operatively-connected member from operative position into neutral position, and means for moving said operatively-connected member in either direction from neutral position into operative position.

4. In control apparatus associated with mechanism for changing the pitch of propeller blades, the combination of a threaded shaft mounted for movement in two directions from neutral position and operatively connected with said pitch change mechanism to initiate action producing increased propeller blade pitch by movement in one direction and to initiate action producing decreased propeller blade pitch by movement in the other direction, a nut movable longitudinally on said shaft under the influence of pitch-changing action of said pitch change mechanism, and means for limiting longitudinal movement of said nut whereby it is caused to move said threaded shaft to neutral position.

5. In control apparatus associated with mechanism for changing the pitch of propeller blades, the combination of two members threaded to each other, one of said members being a travelling member and the other being a control member being movable in two directions from neutral position and operatively connected with said pitch change mechanism to initiate action producing increased propeller blade pitch by movement in one direction and to initiate action producing decreased propeller blade pitch by movement in the other direction, connections for rotating the members at equal speed whereby their relative position is unchanged and for rotating the members at unequal speed whereby the travelling member is given movement of translation relatively to said operatively-connected member, a structure comprising two stops mounted in a position remote from the pitch-changing mechanism, a pilot's control element movable between said stops and comprising a contact member co-operating with the stops, and a single line of mechanical connections between said pilot's control element and said travelling member whereby manual operation of said element serves to move the control member operatively-connected with the pitch-changing mechanism from neutral position into operative position and movement of said pilot's control element and related movement of said travelling member is limited by said stops.

6. In control apparatus associated with mechanism for changing the pitch of propeller blades, the combination of a control member operatively connected with the pitch-changing mechanism and movable in two directions from neutral position to act upon the pitch-changing mechanism to produce respectively increased propeller blade pitch or decreased propeller blade pitch, a travelling member movable under the influence of said pitch-changing mechanism and associated with said movable control member to move the same from either operative position into neutral position, with a structure comprising two stops mounted in a position remote from the pitch-changing mechanism, a pilot's control element movable between the stops and comprising a contact member co-operating with the stops, and a single line of mechanical connections between said pilot's control element and said travelling member whereby manual operation of said element serves to move the control member operatively connected with the pitch-changing mechanism from neutral position into operative position and movement of said pilot's control element and related movement of said travelling member is limited by said stops.

7. In control apparatus associated with mechanism for changing the pitch of propeller blades, the combination of a control member operatively connected with the pitch-changing mechanism and movable in two directions from neutral position to act upon the pitch-changing mechanism to produce respectively increased propeller blade pitch or decreased propeller blade pitch, a travelling member movable under the influence of said pitch-changing mechanism and associated with said movable control member to move the same from either operative position into neutral position, with a structure comprising two stops remote from the pitch-changing mechanism, a pilot's control element movable between the stops and comprising a contact member co-operating with the stops, a single line of mechanical connections between said pilot's control element and said travelling member whereby manual operation of said element serves to move the control member operatively connected with the pitch-changing mechanism from neutral position into operative position and movement of said pilot's control element and related movement of said travelling member is limited by said stops, and keepers acting to keep the pilot's control element at either limit of its movement as defined by the said stops.

8. In control apparatus for association with mechanism for changing the pitch of propeller blades, the combination of two associated members, of which one is a control member operatively connected with said pitch change mechanism and movable in two directions from neutral position to initiate action producing increased propeller blade pitch by movement in one direction and to initiate action resulting in decreased propeller blade pitch by movement in the other direction and the other member is a travelling member having connection with said operatively connected control member permitting movement of translation relatively thereto, stops arranged to limit movement of said travelling member whereby at either limit of its travel it acts to force said operatively-connected member from either operative position into neutral position, and means for moving said operatively-connected member in either direction from neutral position into operative position.

CLARENCE KIRK GREENE.